April 10, 1934.    A. F. SANDERS ET AL    1,954,714
METHOD OF MAKING PISTON RINGS
Filed July 21, 1933
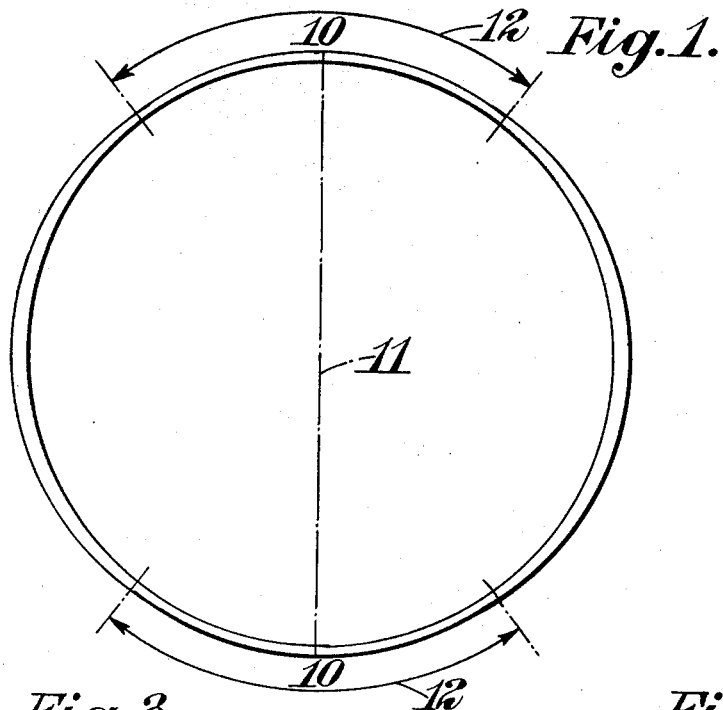
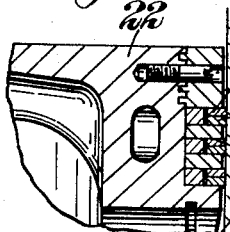
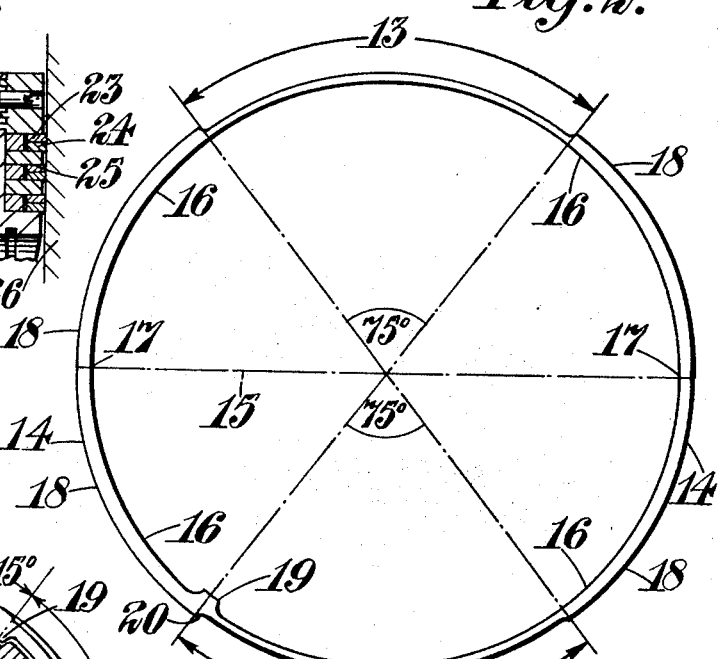
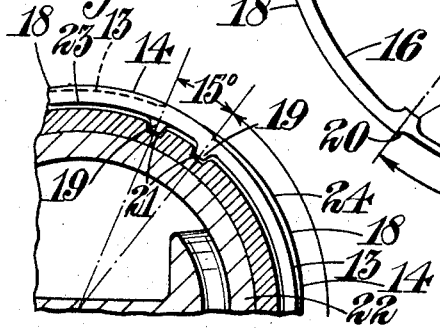
Inventors
A. F. Sanders
and J. W. Howlett
by Mawhinney & Mawhinney
Attorneys.

Patented Apr. 10, 1934

1,954,714

UNITED STATES PATENT OFFICE 1,954,714

METHOD OF MAKING PISTON RINGS

Arthur Freeman Sanders, Dursley, and John William Howlett, Lymington, England, assignors of one-third to R. A. Lister & Company Limited, Dursley, England Application July 21, 1933, Serial No. 681,620
In Great Britain June 4, 1932

5 Claims. (Cl. 29—156.61)

This invention relates to continuous (i. e., non-split) piston-rings, particularly for use as referred to in the specification accompanying patent application Serial No. 679,230 in the name of Arthur Freeman Sanders, assignor to R. A. Lister & Company Limited, and it has for its object to provide improved continuous rings and improved methods of manufacturing them.

In the specification aforesaid, a group of continuous piston-rings is held on a reduced portion of the piston head, and in one case the rings are slightly non-circular and arranged with their major axes inclined to one another, so as to unite in providing a complete seal. Very slight non-circularity, of the order of one or a few thousandths of an inch, is all that is necessary.

The present invention broadly comprises a continuous piston-ring which is of slightly non-circular contour before assembly with the associated cylinder.

In the manufacture of these rings, according to one feature of the invention, they could be turned to such size as to be a good working fit in the cylinder barrel, when allowing for expansion under heat, and the metal at the ends of a diameter then squeezed in a substantially radial direction over a short distance in such manner that it flows circumferentially, whereby a slightly elliptical ring is formed with its major axis approximately at right-angles to the said diameter.

According to a further feature of the inventon, a ring is relieved on its exterior periphery over arcs where contact with the cylinder walls is not required, and the contact arcs are specially shaped to exert a practically uniform pressure on the cylinder throughout their lengths.

In the accompanying drawing:—

Figures 1 and 2 are exaggerated views of two different forms of piston-ring manufactured according to this invention; and Figures 3 and 4 are fragmentary longitudinal and transverse sections, respectively, through a piston fitted with three pairs of piston-rings of the kind shown in Figure 2.

In the construction of Figure 1, the ring is turned from relatively soft cast iron and then peened over approximately one-quarter or one-fifth of its circumference, as indicated at 10, 10, at the two ends of a diameter 11 of the ring, as by being subjected in the known manner to blows from a V-edged hammer delivered against its internal periphery whilst it is being suitably held. This causes the metal at those places to flow slightly circumferentially, as indicated by the arrows 12, 12, resulting in the manufacture of a piston-ring of the necessary non-circularity with its major axis at right-angles to the diameter 11. Thereafter the ring may be hardened, as by being subjected to a heat-treatment process, to ensure that it will retain its shape.

In an alternative arrangement, as shown in Figure 2, a circular ring has its outer periphery cut away, or "relieved", by a few thousandths of an inch over short arcs 13, 13, subtending angles of about seventy-five degrees. These short "relieved" arcs embrace the minor axis, and in use they are not adapted normally to make contact with, or at any rate to exert much pressure upon, the cylinder walls. They provide resilient portions which permit the whole ring, in spite of the fact that it is continuous, to yield radially when in use.

The intervening arcs 14, 14, which embrace the major axis 15, are adapted to exert the required pressure upon the cylinder wall, and, to ensure that this pressure is practically even throughout the whole extent of each arc, the exterior periphery of each is specially shaped. One method is to place the "relieved" ring in a circular die of the size of the cylinder bore, and then peen the interior of the ring at the necessary points. For example, peening may be applied near the end of each contact arc, as at 16, 16, and also near its mid length, as at 17, having the effect, when the ring is free, of causing slight flats in the outer periphery at the peening points, with intermediate very slight humps, as at 18, 18. When the ring is in position in the cylinder it then exerts a practically uniform pressure over the whole of its contact arcs if the peening has been correctly carried out.

Alternatively, the exterior of the contact arcs 14, 14 may be shaped, as by a machining or grinding operation, to give them a contour slightly different from that of a circular curve which will result in the desired even pressure when the ring is in use.

Each ring has to be located to prevent twisting on the piston. For example, the inner periphery of each may be provided with at least one inward projection 19 which is preferably nearly opposite one of the slight shoulders 20 at the ends of one of the relieved portions, and this inward projection would be adapted to engage a locating notch 21 in the piston 22 to prevent the ring turning, as illustrated in Figures 3 and 4 and more fully described in the specification aforesaid.

In use, a minimum of two rings 23, 24 would be fitted in each piston-ring groove 25 with their major axes at right-angles to one another, so that the long contact arcs 14 of the upper ring overlie the shorter clearance arcs 13 of the lower ring, each mutually sealing its neighbour. With the major axes of a pair of rings at right-angles to one another, the notches 21 in the piston can be arranged at the ends of an arc subtending an angle of about fifteen degrees for the particular arrangement illustrated.

In this way very efficient sealing qualities can be obtained with only two rings, though preferably three pairs of rings would be used, and the ring pressure upon the cylinder walls 26 is practically uniform and need not be very high.

The invention is not limited to rings having pressure and non-pressure arcs of the specified dimensions, nor is the specific shaping of the contact arcs essential to produce the required results.

What we claim as our invention and desire to secure by Letters Patent of the United States is:—

1. The method of making a continuous non-circular piston-ring which comprises relieving the ring on its exterior periphery over spaced arcs, and making the contour of the intervening arcs non-circular.

2. The method of making a continuous non-circular piston-ring which comprises relieving the ring on its exterior periphery over spaced arcs where contact with the cylinder walls is not required, and squeezing the metal of the intervening arcs at a plurality of points in a substantially radial direction.

3. The method of making a continuous piston-ring which comprises relieving the ring on its exterior periphery over spaced arcs where contact with the cylinder walls is not required, and peening the ring near the ends and the centre of the intervening arcs.

4. The method of making a continuous non-circular piston-ring which comprises relieving the ring on its periphery over spaced arcs, placing the relieved ring in a circular die of the size of the cylinder bore, and peening the interior of the intervening arcs at various points.

5. That method of making continuous piston-rings, which consists in recessing outer peripheral portions of the ring body to provide relieved arc portions and intermediate cylinder wall engaging arc portions, and peening the cylinder wall engaging arc portions near their ends and at their intermediate portions to make the portions non-circular relative to the ring and insure a uniform fitting thereof against the cylinder wall.

ARTHUR FREEMAN SANDERS.
JOHN WILLIAM HOWLETT.